Sept. 9, 1941.      O. SEVERSON      2,255,737

TOOL BIT AND TOOLHOLDER THEREFOR

Filed June 27, 1939

INVENTOR
OLE SEVERSON
BY *H. T. Sperry*
ATTORNEY

Patented Sept. 9, 1941

2,255,737

UNITED STATES PATENT OFFICE 2,255,737

TOOL BIT AND TOOLHOLDER THEREFOR

Ole Severson, Shelton, Conn., assignor to The Apex Tool & Cutter Company, Inc., a corporation of Connecticut Application June 27, 1939, Serial No. 281,408

5 Claims. (Cl. 29—96)

The invention relates to improvements in tool bits and tool holders therefor of the draw-bolt type and particularly designed for use in connection with metal working apparatuses, such as, boring mills, lathes, planers and the like.

It is among the general objects of the invention to provide a new and efficient bit and holder assembly, which will give increased rigidity to the structure holding a cutting tool in contact with the surface to be worked.

Another object of the invention is to provide the structure with an interrelationship of parts which is designed to reduce, to a minimum, the possibility of accidental movement between the bit and holder so as to avoid any chattering or vibration between tool and work.

Another important object is to provide in a rigid tool assembly easy adjustability in the relation of the bit to holder, the same being accessible without sacrifice of rigidity of parts after adjustment.

A further object is to provide a structure of minimum parts and maximum efficiency so as to achieve a novel simple and efficient device adopted to fill the need for an inexpensive durable tool holder.

The present invention is an improvement over my prior Patent Number 2,063,129, dated December 8, 1936, and partakes of the objects thereof, but distinguishes therefrom in that the tool bit lies directly upon a tool seat formed integral with the holder body a wedge being disposed above the bit shank to secure the same against the tool seat. By this arrangement, various types of serrations may be formed on shank and seat to provide interlocking therebetween. Such arrangement is further advantageous in that it permits of a straight tool holder body not requiring offset extensions thereof to accommodate the adjusting parts or to provide adequate backing for the holding parts. This arrangement has the further advantage of securing the tool bit shank in direct line with the holder body and avoiding the angularity of the bit with respect to the body used in my prior patent, which prior angularity may lead to confusion in tool grinding.

Other objects featured in the invention will be apparent from a consideration of the present specifications taken in connection with the accompanying drawing in which—

The tool holder is generally characterized by the provision of a furcated and elongated tool body, the furcation of which forms an integral stationary tool seat parallel with the axis of the body. The opposite face of the furcation is directed at an angle outwardly diverging from the body axis. A longitudinally movable wedge bears against the angled furcation wall. The shank of the tool bit is mounted on the seat and its upper face receives the lower face of the wedge whereby longitudinal movement of the wedge will secure the shank against the tool seat. The wedge is adopted to be drawn inwardly to apply the holding force upon the bit by means of a draw-bolt extending longitudinally through the holder.

The invention is, also, characterized by the provision of serrations between tool shank and tool seat and/or between wedge and shank. In one form of the invention, star serrations between shank and seat alone are used, while in another form of the invention, shank and seat have transverse serrations while wedge and shank have longitudinal serrations.

Figure 1:
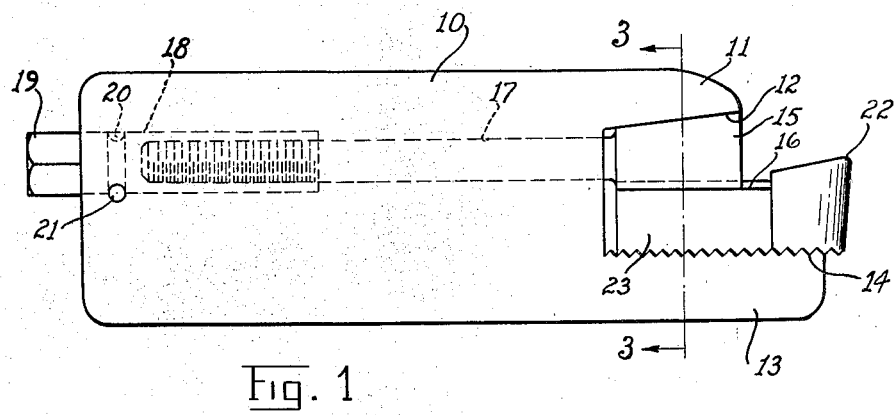
Figure 1 is a side elevation of a tool bit and tool holder assembly made in accordance with one form of the present invention.

Referring more particularly to Figure 1 of the drawing, the numeral 10 indicates the body or shank of the tool holder, the forward end of which is furcated, including an upper furcation 11 having a plane inner surface 12 lying in a plane at an angle to the axis of the body, and a lower furcation 13 having an inner surface 14 lying parallel to the axis of the body and being formed with transverse serrations. The tapered wedge is indicated by the numeral 15, its upper face being plane and lying at an angle to conform to the plane of the face 12 over which it moves. The lower face 16 of the wedge 15 lies parallel with the axis of the body and thus parallel with the inner surface 14 of the lower furcation 13. The wedge is mounted upon and operated by a longitudinally extending draw bolt 17. The rear end of the bolt being threaded to engage the threads of a hollow drawing member 18 which has a square extension 19 extending beyond the body and, which has a groove 20 which may be engaged by a cross-pin 21 so as to preclude longitudinal movement of the drawing member 18 upon rotation thereof. Obviously, the rotation of the member 18 will, through its engagement with the threaded end of the bolt 17 produce a longitudinal movement of the draw-bolt and the wedge 15; the direction of movement being determined by the direction of rotation.

The tool bit, itself, includes the cutting edge 22 and the tool shank 23 the latter having a lower transversely serrated face which cooperates with the serrations of the face 14 of the tool-seat in providing means for precluding longitudinal movement of the bit with respect to the tool seat. The upper face of the shank 23 is provided with longitudinal serrations cooperating with the longitudinal serrations of the bottom face of the wedge and thereby locking the bit against transverse movement. It will be noted that this arrangement permits longitudinal movement of wedge with respect to the bit without permitting movement of the bit in the holder. Thus with the bit placed in desired position, the wedge may be moved to lock the same securely in position without disturbing its original setting.

Figure 2:
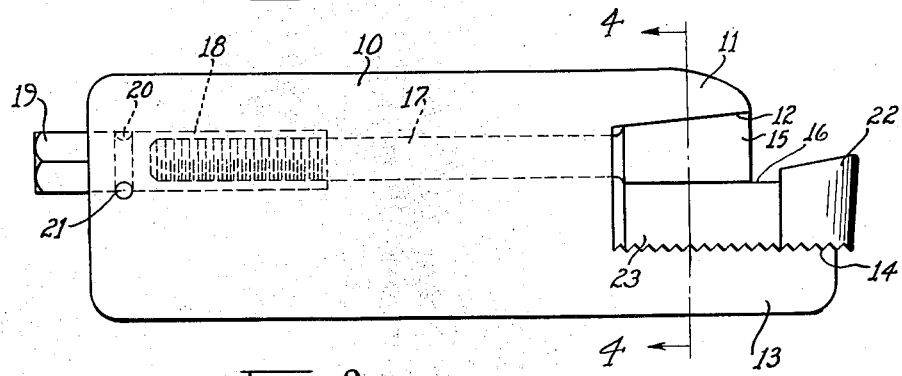
Figure 2 is a similar view of a modification of the invention shown in Figure 1.
Figure 3:
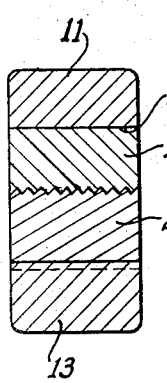
Figure 3 is a vertical section taken on line 3—3 of Figure 1.
Figure 4:
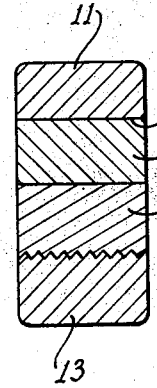
Figure 4 is a similar view taken on line 4—4 of Figure 2.
Figure 5:
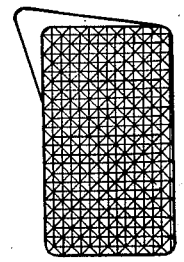
Figure 5 is a bottom plan view of the tool bit of Figure 2.

Referring now to Figures 2, 4 and 5, it will be seen that the structure is the same except that the tool seat and the under face of the tool shank are formed with cooperating star serrations. That is, compound serrations extending at right angles to each other and at 45 degrees from the axis of the body. By this arrangement, both transverse and longitudinal movement of the bit during tightening of the wedge is precluded without requiring any serrations on the wedge itself.

With regard to the serrations, it is understood that an interchange of the serrations between top and bottom of the shank may be resorted to and star serrations may, if desired, be used between wedge and shank in lieu of shank and tool seat serrations. Thus it will be seen that the full use of equivalents may be resorted to without departure from the spirit or scope of the invention. In the form of the invention here shown, it will be noted that the top and bottom of the bit shank are parallel and that longitudinal movement of the wedge will move its bottom parallel surface towards the parallel surface of the top of the shank. Such action will, of course, involve a springing of the wedge and its bolt, which by the structure of such devices and the small amount of locking movement required, is permissible. However, if such springing of the wedge or bolt from its normal position is objectionable, it will be understood that the upper face of wedge and the surface 12 of furcation 11 may be formed parallel with the axis of the holder and the desired inclination may be had by inclining the lower face of the wedge and the upper face of the shank. It will be understood that such changes and modifications will not constitute a departure from the spirit or scope of the present invention as outlined in the appended claims.

What I claim is:

1. In a tool bit and holder combination, a holder having a furcated end, the inner surfaces of the furcation being angularly disposed, one of said surfaces constituting a tool seat, a tool bit having its shank disposed between said surfaces, a bit retaining member having one surface thereof parallel with one surface of the furcation and another surface thereof parallel with another surface of the furcation, means for moving said retaining member longitudinally within said furcation, and cooperating means on said bit and tool seat to preclude movement therebetween.

2. In a tool bit and holder combination, a holder having a furcated end, the inner surfaces of the furcation being angularly disposed, one of said surfaces constituting a tool seat, a tool bit having its shank disposed between said surfaces, a bit retaining member having one surface thereof parallel with one surface of the furcation and another surface thereof parallel with another surface of the furcation, means for moving said retaining member longitudinally within said furcation, and cooperating means on said bit and tool seat to preclude longitudinal movement therebetween.

3. In a tool bit and holder combination, a holder having a furcated end the inner surfaces of which furcation are angularly disposed, a bit retaining member located within said furcation and having one surface thereof parallel with one of the angularly disposed surfaces of the furcation and another surface parallel with the other angularly disposed surface of the furcation, means for moving said retaining member longitudinally within said furcation and a tool bit having the shank thereof disposed between spaced surfaces of said furcation and retaining member, said shank and at least one of said spaced surfaces having complementary serrations thereon cooperating to preclude longitudinal movement of said tool bit with respect to said holder.

4. In a tool bit and holder combination, a holder having a furcated end the inner surfaces of which furcation are angularly disposed, a bit retaining member located within said furcation and having one surface thereof parallel with one of the angularly disposed surfaces of the furcation and another surface parallel with the other angularly disposed surface of the furcation, means for moving said retaining member longitudinally within said furcation and a tool bit having the shank thereof disposed between spaced surfaces of said furcation and retaining member, said shank having serrations on opposite surfaces thereof engaging complementary serrations on said spaced surfaces of the furcation and retaining member to preclude movement of said tool bit with respect to said holder.

5. In a tool bit and holder combination, a holder having a furcated end the inner surfaces of which furcation are angularly disposed, a bit retaining member located within said furcation and having one surface thereof parallel with one of the angularly disposed surfaces of the furcation and another surface parallel with the other angularly disposed surface of the furcation, means for moving said retaining member longitudinally within said furcation and a tool bit having the shank thereof disposed between spaced surfaces of said furcation and retaining member, said shank having longitudinally extending serrations on one surface thereof and transversely extending serrations on the opposite surface thereof engaging complementary serrations on said spaced surfaces of the furcation and retaining member to preclude movement of said tool bit with respect to said holder.

OLE SEVERSON.